(12) United States Patent
Wang et al.

(10) Patent No.: US 9,998,267 B2
(45) Date of Patent: Jun. 12, 2018

(54) METHOD AND APPARATUS FOR UPLINK DATA TRANSMISSION IN A WIRELESS COMMUNICATION SYSTEM

(71) Applicant: NEC (China) Co., Ltd., Beijing (CN)

(72) Inventors: Gang Wang, Beijing (CN); Zhennian Sun, Beijing (CN); Ming Lei, Beijing (CN)

(73) Assignee: NEC (China) Co., Ltd., Beijing (CN)

( * ) Notice: Subject to any disclaimer, the term of this patent is extended or adjusted under 35 U.S.C. 154(b) by 91 days.

(21) Appl. No.: 14/914,099

(22) PCT Filed: Sep. 25, 2013

(86) PCT No.: PCT/CN2013/084214
§ 371 (c)(1),
(2) Date: Feb. 24, 2016

(87) PCT Pub. No.: WO2015/042810
PCT Pub. Date: Apr. 2, 2015

(65) Prior Publication Data
US 2016/0211960 A1    Jul. 21, 2016

(51) Int. Cl.
*H04W 16/26* (2009.01)
*H04L 5/00* (2006.01)
*H04L 25/02* (2006.01)

(52) U.S. Cl.
CPC .......... *H04L 5/0048* (2013.01); *H04L 5/0051* (2013.01); *H04L 5/0096* (2013.01); *H04L 25/0202* (2013.01); *H04L 25/0224* (2013.01)

(58) Field of Classification Search
CPC . H04L 5/0048; H04L 5/0053; H04L 25/0202; H04W 4/005; H04W 72/0446
(Continued)

(56) References Cited

U.S. PATENT DOCUMENTS

| 2013/0100901 A1* | 4/2013 | Shan | H04L 5/0048 370/329 |
| 2013/0121276 A1* | 5/2013 | Kim | H04W 72/0406 370/329 |

(Continued)

FOREIGN PATENT DOCUMENTS

| CN | 101686110 A | 3/2010 |
| CN | 102957654 A | 3/2013 |

(Continued)

OTHER PUBLICATIONS

International Search Report of PCT/CN2013/084214 dated Jul. 1, 2014 [PCT/ISA/210].

(Continued)

*Primary Examiner* — Charles C Jiang
*Assistant Examiner* — Will Lin
(74) *Attorney, Agent, or Firm* — Sughrue Mion, PLLC

(57) ABSTRACT

Embodiments of the present disclosure relate to uplink data transmission in a wireless communication system. In an embodiment of the present disclosure, there is provided a method for uplink data transmission in a wireless communication system. The method comprises transmitting an indication for new-type reference signals to a user equipment, wherein the new-type reference signals have a reduced density of reference signals in frequency domain, and resource elements not used by reference signals in symbols for the new-type reference signals are used for coverage enhancement; receiving the new-type reference signals; and performing channel estimation based on the new-type reference signals. With embodiments of the present disclosure, it may reduce the density of reference signals in frequency domain, which means the overhead will not be increased substantially and besides saved resource element may be used to implement the coverage enhancement. Thus, the number of retransmission of MTC UE in low SNR could be (Continued)

further reduced, which in turn results in the improvement of the system throughput. Accordingly, it is possible for a UE with a low SNR to be used in LTE networks.

31 Claims, 11 Drawing Sheets

(58) Field of Classification Search
USPC .................................................. 370/329, 330
See application file for complete search history.

(56) References Cited

U.S. PATENT DOCUMENTS

2013/0265955 A1* 10/2013 Kim ...................... H04W 72/04
 370/329
2014/0036747 A1* 2/2014 Nory ................. H04W 72/0406
 370/311
2017/0105127 A1* 4/2017 Xiong ................... H04W 16/26

FOREIGN PATENT DOCUMENTS

| JP | 2011528887 A | 11/2011 |
| JP | 2011250184 A | 12/2011 |
| WO | 2010016240 A1 | 2/2010 |
| WO | 2010087173 A1 | 8/2010 |

OTHER PUBLICATIONS

Written Opinion of PCT/CN2013/084214 dated Jul. 1, 2014 [PCT/ISA/237].
Communication dated Mar. 14, 2017 from the Japanese Patent Office in counterpart Japanese application No. 2016-543287.

* cited by examiner

| u | φ(0), ..., φ(11) |
|---|---|
| 0 | -1, 1, 3, -3, 3, 3, 1, 1, 3, 1, -3, 3 |
| 1 | 1, 1, 3, 3, 3, -1, 1, -3, -3, 1, -3, 3 |
| 2 | 1, 1, -3, -3, -3, -1, -3, -3, 1, -3, 1, -1 |
| 3 | -1, 1, 1, 1, 1, -1, -3, -3, 1, -3, 3, -1 |
| 4 | -1, 3, 1, -1, 1, -1, -3, -1, 1, -1, 1, 3 |
| 5 | 1, -3, 3, -1, -1, 1, 1, -1, -1, 3, -3, 1 |
| 6 | -1, 3, -3, -3, -3, 3, 1, -1, 3, 3, -3, 1 |
| 7 | -3, -1, -1, -1, 1, -3, 3, -1, 1, -3, 3, 1 |
| 8 | 1, -3, 3, 1, -1, -1, -1, 1, 1, 3, -1, 1 |
| 9 | 1, -3, -1, 3, 3, -1, -3, 1, 1, 1, 1, 1 |
| 10 | -1, 3, -1, 1, 1, -3, -3, -1, -3, -3, 3, -1 |
| 11 | 3, 1, -1, -1, 3, 3, -3, 1, 3, 1, 3, 3 |
| 12 | 1, -3, 1, 1, -3, 1, 1, 1, -3, -3, -3, 1 |
| 13 | 3, 3, -3, 3, -3, 1, 1, 3, -1, -3, 3, 3 |
| 14 | -3, 1, -1, -3, -1, 3, 1, 3, 3, 3, -1, 1 |
| 15 | 3, -1, 1, -3, -1, -1, 1, 1, 3, 1, -1, -3 |
| 16 | 1, 3, 1, -1, 1, 3, 3, 3, -1, -1, 3, -1 |
| 17 | -3, 1, 1, 3, -3, 3, -3, -3, 3, 1, 3, -1 |
| 18 | -3, 3, 1, 1, -3, 1, -3, -3, -1, -1, 1, -3 |
| 19 | -1, 3, 1, 3, 1, -1, -1, 3, -3, -1, -3, -1 |
| 20 | -1, -3, 1, 1, 1, 1, 3, 1, -1, 1, -3, -1 |
| 21 | -1, 3, -1, 1, -3, -3, -3, -3, -3, 1, -1, -3 |
| 22 | 1, 1, -3, -3, -3, -1, 3, -3, 1, -3, 3 |
| 23 | 1, -1, -3, -1, -3, 1, -1, 1, 3, -1, 1 |
| 24 | 1, 1, 3, 1, 3, 3, -1, 1, -1, -3, -3, 1 |
| 25 | 1, -3, 3, 3, 1, 3, 3, 1, -3, -1, -1, 3 |
| 26 | 1, 3, -3, -3, 3, -3, 1, -1, -1, 3, -1, -3 |
| 27 | -3, -1, -3, -1, -3, 3, 1, -1, 1, 3, -3, -3 |
| 28 | -1, 3, -3, 3, -1, 3, 3, -3, 3, 3, -1, -1 |
| 29 | 3, -3, -3, -1, -1, -3, -1, 3, -3, 3, 1, -1 |

Fig. 6

METHOD AND APPARATUS FOR UPLINK DATA TRANSMISSION IN A WIRELESS COMMUNICATION SYSTEM

FIELD OF THE INVENTION

Embodiments of the present disclosure generally relate to wireless communication techniques and more particularly relate to a method and apparatus for uplink data transmission in a wireless communication system.

BACKGROUND OF THE INVENTION

With the constant increase of mobile data services, the 3rd Generation Partnership Project (3GPP) organization has developed long-term evolution (LTE) specifications and LTE-Advanced (LTE-A) specifications. As the next generation cellular communication standard, an LTE or LTE-A system can operate in both Frequency Division Duplex (FDD) mode and Time Division Duplex (TDD) mode.

Machine-to-Machine (M2M) communication, which may also be called as Machine-Type Communications (MTC), is an emerging communication pattern. It refers to communication between computers, embedded processors, smart sensors, actuators and mobiles devices without or with only limited human intervention and it is quite advantageous in many applications such as sensing in extreme or hazard environment. Generally, many of MTC UEs are targeted for low-end applications (low average revenue per user, and low data rate) that can be handled adequately by GSM/GPRS and thus they may be implemented at low cost.

As LTE deployments evolve, it is desirable to reduce the cost of overall network maintenance by minimizing the number of Radio Access Technologies (RATs). However, there are deployed more and more MTC UEs in the field, which increases reliance on GSM/GPRS networks, and thus cost for operating these networks are increased. Hence, it will be very beneficial if low-end MTC UEs may be migrated from GSM/GPRS to LTE Networks.

It is known that in LTE releases 8 to 11, data transmission is designed for medium or high SNR (SNR>−5 dB), but SNR of MTC UE could be as low as −25.3 dB. Accordingly, it is rather challenging to support MTC UEs in current Available LTE release.

Regarding the MTC UE migration, the 3GPP has started a study item to study a possibility to support MTC UEs in a low SNR region. FIG. 1 illustrates a mapping of uplink demodulation reference signals (DMRS) as proposed in 3GPP TS 36.211. In this figure, each block represents a resource element (RE) and REs in two symbols are used to transmit uplink DMRS and other REs are used to transmit data. However, the DMRS configuration is designed for medium or high SNR. Whereas the MTC normally operates with a low SNR and thus the DMRS pattern is not suitable for the MTC at all.

In 3GPP technical document TR 36.888, there are proposed approaches to support low-cost MTC UEs based on LTE, wherein the possibility of increasing the density of reference signal is discussed. It is known that the number of retransmission/repetition for MTC UE largely relies on the accuracy of channel estimation. Increasing the density of reference signal in time domain can improve the accuracy of the channel estimation in low SNR. However, it will increase the overhead definitely if the density of reference signals is increased, which will in turn increase the coding rate. This means that usually, increasing density of uplink DMRS might not obtain performance gains as expected.

Therefore, there is a need for a new solution of uplink data transmission in a wireless communication system for improving accuracy of channel estimation in a low SNR communication such as MTC.

SUMMARY OF THE INVENTION

In view of the foregoing, the present disclosure provides a new solution for uplink data transmission in a wireless communication system so as to solve or at least partially mitigate at least a part of problems in the prior art.

According to a first aspect of the present disclosure, there is provided a method for downlink data transmission in a wireless communication system. The method may comprise transmitting an indication for new-type reference signals to a user equipment, wherein the new-type reference signals have a reduced density of reference signals in frequency domain, and resource elements not used by reference signals in symbols for the new-type reference signals are used for coverage enhancement; receiving the new-type reference signals; and performing channel estimation based on the new-type reference signals.

In an embodiment of the present disclosure, the new-type reference signals may comprise reference signals spaced by one or more subcarriers in the frequency domain.

In another further embodiment of the present disclosure, the new-type reference signals may have an increased density of reference signals in time domain.

In a further embodiment of the present disclosure, the new-type reference signals may comprise reference signals in legacy symbols for reference signals and additional reference signals in symbols spaced from the legacy symbols by two symbols in time domain.

In a yet embodiment of the present disclosure, the method may further comprise: receiving data in the resource elements not used by reference signals in the symbols for the new-type reference signals.

In a still embodiment of the present disclosure, the resource elements not used by reference signals in the symbols for the new-type reference signals are kept unused as empty resource elements.

In a still further embodiment of the present disclosure, the new-type reference signals may be transmitted with an increased power that is borrowed from the empty resource elements.

In a yet further embodiment of the present disclosure, the method may further comprises performing data detection based on a mapping of the new-type reference signals.

In a yet still embodiment of the present disclosure, the method may be performed in response to a coverage enhancement determination for the user equipment.

In another embodiment of the present disclosure, the method may further comprise estimating a transmission repetition number for the user equipment based on signal to noise ratio; and transmitting the transmission repetition number to the user equipment.

In a further embodiment of the present disclosure, the new-type reference signals comprise demodulation reference signals (DMRS).

According to a second aspect of the present disclosure, there is also provided a method for uplink data transmission in a wireless communication system. The method may comprise: receiving an indication for new-type reference signals from a base station, wherein the new-type reference signals have a reduced density of reference signals in frequency domain, and resource elements not used by reference signals in symbols for the new-type reference signals are used for coverage enhancement; and transmitting the new-type reference signals to the base station for using in channel estimation.

According to a third aspect of the present disclosure, there is further provided an apparatus for uplink data transmission in a wireless communication system. The apparatus may comprise an indication transmission unit configured to transmit an indication for new-type reference signals to a user equipment, wherein the new-type reference signals have a reduced density of reference signals in frequency domain, and resource elements not used by reference signals in symbols for the new-type reference signals are used for coverage enhancement; a signal receiving unit configured to receive the new-type reference signals; and an estimation performing unit configured to perform channel estimation based on the new-type reference signals.

According to a fourth aspect of the present disclosure, there is further provided an apparatus for uplink data transmission in a wireless communication system. The apparatus may comprise an indication receiving unit configured to receive an indication for new-type reference signals from a base station, wherein the new-type reference signals have a reduced density of reference signals in frequency domain, and resource elements not used by reference signals in symbols for the new-type reference signals are used for coverage enhancement; and a signal transmission unit configured to transmit the new-type reference signals to the base station for using in channel estimation.

According to a fifth aspect of the present disclosure, there is also provided a computer-readable storage media with computer program code embodied thereon, the computer program code configured to, when executed, cause an apparatus to perform actions in the method according to any embodiment in the first aspect.

According to a sixth aspect of the present disclosure, there is further provided a computer-readable storage media with computer program code embodied thereon, the computer program code configured to, when executed, cause an apparatus to perform actions in the method according to any embodiment in the second aspect.

According to a seventh aspect of the present disclosure, there is provided a computer program product comprising a computer-readable storage media according to the fifth aspect.

According to an eighth aspect of the present disclosure, there is further provided a computer program product comprising a computer-readable storage media according to the sixth aspect.

In embodiments of the present disclosure, there is provided an uplink data transmission solution in wireless communication. With embodiments of the present disclosure, it may reduce the density of reference signals in frequency domain, which means the overhead will not be increased substantially and saved resource element may be used to implement the coverage enhancement. Thus, the number of retransmission of MTC UE in low SNR could be further reduced, which in turn result in the improvement of the system throughput. Accordingly, it may support UE with a low SNR in LTE networks, which reduce reliance on the older communication networks such as GSM/GPRS networks.

BRIEF DESCRIPTION OF THE DRAWINGS

The above and other features of the present disclosure will become more apparent through detailed explanation on the embodiments as illustrated in the embodiments with reference to the accompanying drawings, throughout which like reference numbers represent same or similar components and wherein:

FIG. 6 schematically illustrates a table of definition of $\varphi(n)$ for $M_{sc}^{RS}=N_{sc}^{RS}$ as specified in 3GPP TS 36.21;

DETAILED DESCRIPTION OF EMBODIMENTS

Figure 1:
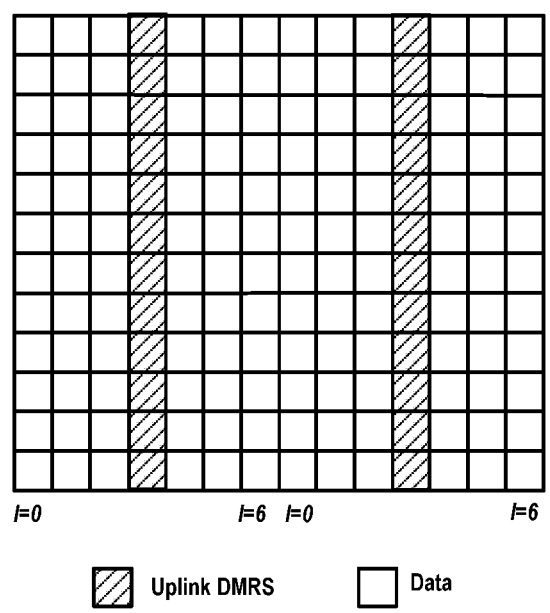
FIG. 1 schematically illustrates a mapping of uplink demodulation reference signals (DMRS) as specified in 3GPP TS 36.211.

Hereinafter, a method and apparatus for uplink data transmission in a wireless communication system will be described in details through embodiments with reference to the accompanying drawings. It should be appreciated that these embodiments are presented only to enable those skilled in the art to better understand and implement the present disclosure, not intended to limit the scope of the present disclosure in any manner.

In the accompanying drawings, various embodiments of the present disclosure are illustrated in block diagrams, flow charts and other diagrams. Each block in the flowcharts or block may represent a module, a program, or a part of code, which contains one or more executable instructions for performing specified logic functions and indispensible block is illustrated in a dotted line. Besides, although these blocks are illustrated in particular sequences for performing the steps of the methods, as a matter of fact, they may not necessarily be performed strictly according to the illustrated sequence. For example, they might be performed in reverse sequence or simultaneously, which is dependent on natures of respective operations. It should also be noted that block diagrams and/or each block in the flowcharts and a combination of thereof may be implemented by a dedicated hardware-based system for performing specified functions/operations or by a combination of dedicated hardware and computer instructions.

Generally, all terms used in the claims are to be interpreted according to their ordinary meaning in the technical field, unless explicitly defined otherwise herein. All references to "a/an/the/said [element, device, component, means, step, etc]" are to be interpreted openly as referring to at least one instance of said element, device, component, means, unit, step, etc., without excluding a plurality of such devices, components, means, units, steps, etc., unless explicitly stated otherwise. Besides, the indefinite article "a/an" as used herein does not exclude a plurality of such steps, units, modules, devices, and objects, and etc.

Additionally, in a context of the present disclosure, a user equipment (UE) may refer to a terminal, a Mobile Terminal (MT), a Subscriber Station (SS), a Portable Subscriber Station (PSS), Mobile Station (MS), or an Access Terminal (AT), and some or all of the functions of the UE, the terminal, the MT, the SS, the PSS, the MS, or the AT may be included. Furthermore, in the context of the present disclosure, the term "BS" may represent, e.g., a node B (NodeB or NB), an evolved NodeB (eNodeB or eNB), a radio header (RH), a remote radio head (RRH), a relay, or a low power node such as a femto, a pico, and so on.

For a better understanding of the present disclosure, the following description will be made to embodiments of the present disclosure by taking MTC as an example. However, as can be appreciated by those skilled in the art, the present invention could be applied to any other suitable communication with a low SNR.

Figure 2:
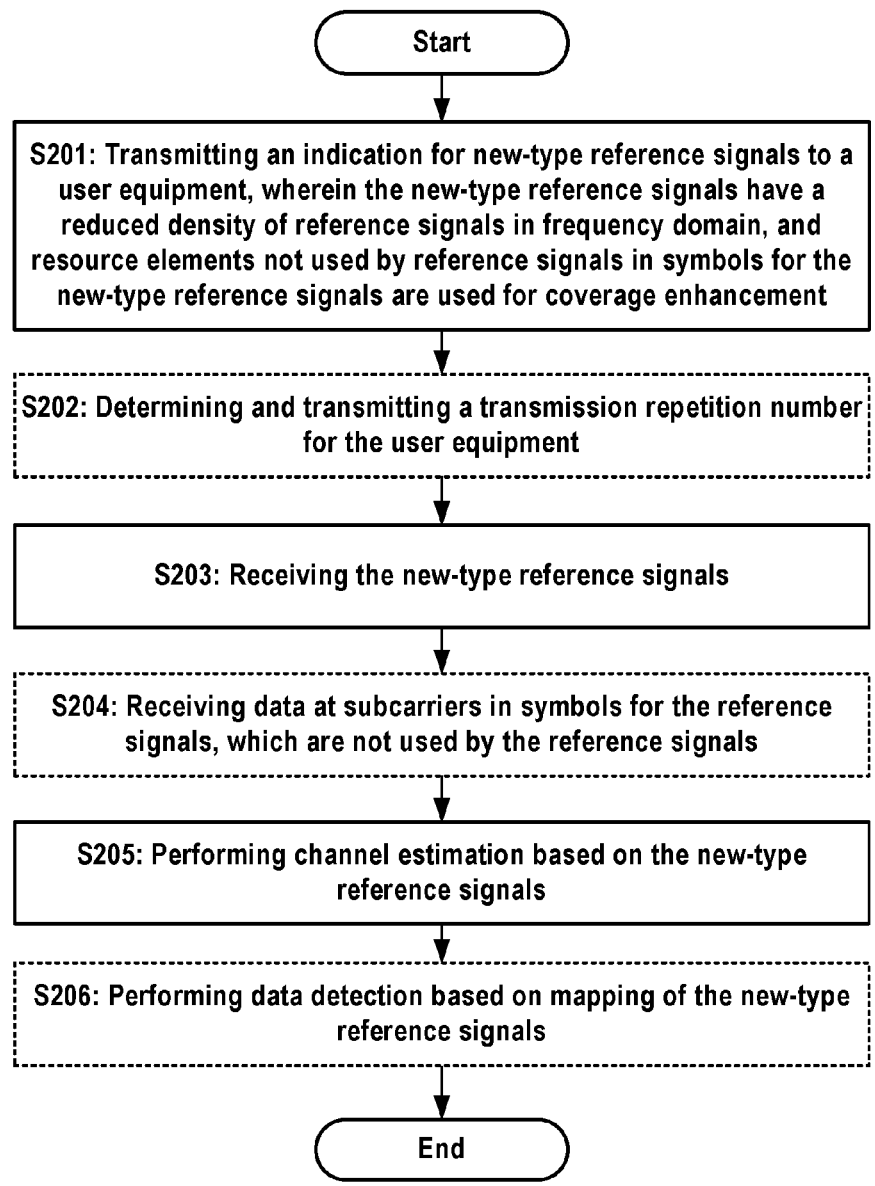
FIG. 2 schematically illustrates a flowchart of a method for uplink data transmission at an eNB in a wireless communication system according to an embodiment of the present disclosure.

First, reference will made to FIG. 2 to describe a method for uplink data transmission at an eNB in a wireless communication system according to an embodiment of the present disclosure.

As illustrated, first at step S201, the eNB may transmit an indication for a new-type reference signal to a user equipment.

As mentioned in background, the DMRS pattern in Rel. 8 is designed for medium or high SNR and it is not suitable for communication with a low SNR such as MTC while increasing of intensity of reference signals will cause a high overhead. In view of this, in the present disclosure, there is proposed a new-type reference signal, which may be called as MTCRS. The main idea is to reduce the density of reference signals in frequency domain and resource elements not used by reference signals in symbols for the new-type reference signals may be used for coverage enhancement. In other word, in frequency domain, only a part of resource elements are used for reference signals and the other part may be saved and used for coverage enhancement. At the same time, it may also be combined with the solution of increasing the density of reference signals in time domain, that is to say, it may also increase the density of reference signals in time domain while reducing the density of reference signals in frequency domain. In such a way, reference signal may be transmitted in more symbols but at less subcarriers.

Figure 3A:
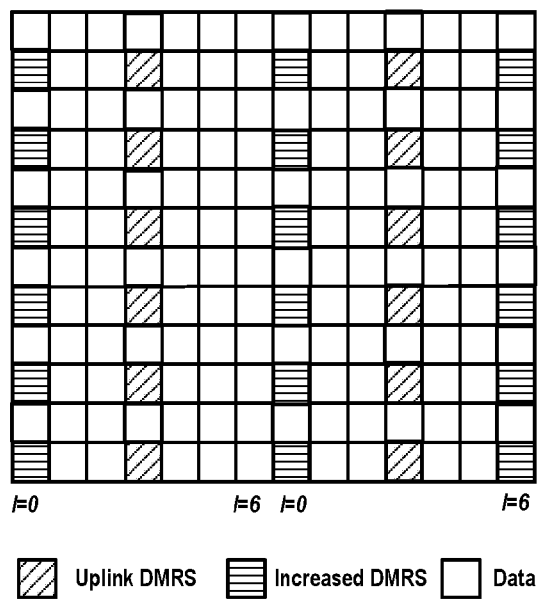
FIG. 3A schematically illustrates an exemplary uplink MTCRS pattern for MTC according to an embodiment of the present disclosure.

FIG. 3A illustrates an exemplary uplink MTCRS pattern for MTC according to an embodiment of the present disclosure. As illustrated in FIG. 3A, in the MTCRS pattern, REs in original symbols for DMRS as specified in 3GPP TS 36.211 are also designed for MTCRS. That is to say, the new-type reference signal also comprises reference signals in legacy symbols for reference signals. Besides these REs, three additional columns of symbols are newly added for reference signals, i.e., totally five columns of symbols are designed for reference signals. Moreover, these symbols for reference signals are dispersed in time domain and preferably distributed evenly. In the illustrated MTCRS pattern, the three additional reference signals in symbols are each spaced from the legacy symbols by two symbols in time domain.

However, compared to the legacy DMRS, the new-type reference signals as provided in the present disclosure have a reduced density of reference signals in frequency domain. For example, the new-type reference signals comprise reference signals spaced by one or more subcarriers in the frequency domain; in other word, unlike the legacy DMRS pattern, reference signals are not continuous in frequency domain. As illustrated in FIG. 3A, the reference signals are spaced by one subcarrier in the frequency domain. In such a way, resource elements for reference signal are dispersed in both time domain and frequency domain. The overhead (i.e., the number of REs for MTCRS) is not increased substantially. The saved REs in frequency may be used for coverage enhancement.

The eNB may transmit the indication for the new-type reference signals by for example a Radio Resource Control (RRC) signaling or any other suitable signaling such as physical layer signaling.

Besides, the eNB may estimate or determine a transmission repetition number for the UE based on signal to noise ratio at step S202. Specifically, the eNB may first estimate SNR for the UE, then by looking up a pre-defined relationship curve between the repetition number and SNR, it may obtain a repetition number N corresponding to the estimated SNR and this obtained repetition number may be estimated as the repetition number N for the UE. After that, the eNB may transmit the transmission repetition number N to the UE so that the UE can learn the transmission repetition number and transmit signals based thereon. That is to say, from the transmission repetition number N, the UE may retransmit the signals until the number of transmission has reached the designated transmission repetition number N.

Then at step S203, the eNB receives the new-type reference signal MTCRS from the UE. In such a way, the UE may use the new-type reference signal MTCRS to perform a channel estimation at step S205.

Additionally, the method may be performed only when the UE needs coverage enhancement. Therefore, in embodiments of the present invention, the method is performed in response to a coverage enhancement determination for the user equipment. When the UE does not require coverage enhancement, the method may not be performed.

Besides, in symbols for the reference signals, resource elements not used by the reference signals may be used for coverage enhancement. In an embodiment of the present disclosure, resource elements not used by the reference signals are used to transmit data. In other words, these resource elements not used by the reference signals may be reused or multiplexed by PUSCH data. In such a way, the coding rate may be decreased, which might facilitate to reduce the repetition number. Thus at step S204, the eNB may receive data at subcarriers in symbols for the reference signals, which are not used by the reference signals.

Figure 3B:
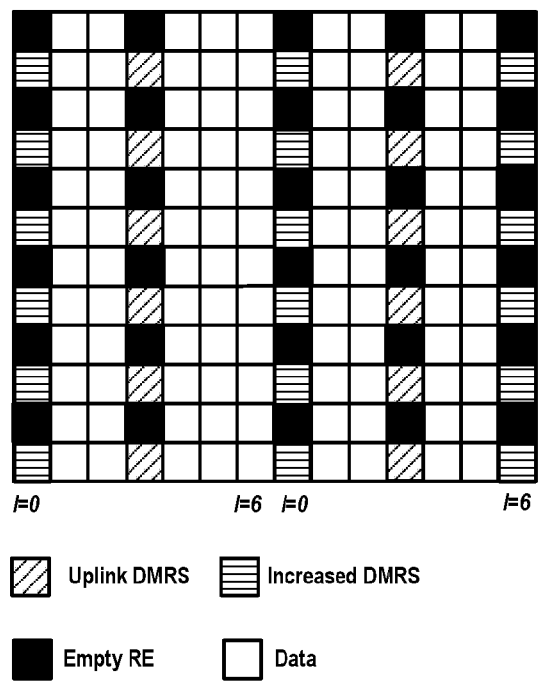
FIG. 3B schematically illustrates an exemplary uplink MTCRS patterns for MTC according to another embodiment of the present disclosure FIG. 3C schematically illustrates an exemplary uplink MTCRS patterns for MTC according to a further embodiment of the present disclosure FIG. 4 schematically illustrates a diagram of uplink physical channel processing according to an embodiment of the present disclosure.

In another embodiment of the present disclosure, these resource elements not used by the reference signals may be used for power boosting. FIG. 3B schematically illustrates another exemplary uplink MTCRS pattern for MTC according to an embodiment of the present disclosure. As illustrated, the MTCRS pattern is substantially similar to that illustrated in FIG. 3A but different in that in symbols for the reference signals, those resource elements not used by the reference signals are kept unused as empty resource elements. In such a case, transmit power for these empty resource elements may be used for the reference signals so that they may be transmitted with an increased power. That is to say, transmit power for these empty resource elements may be lent to reference signals so that power boosting is performed on the reference signals.

Figure 3C:
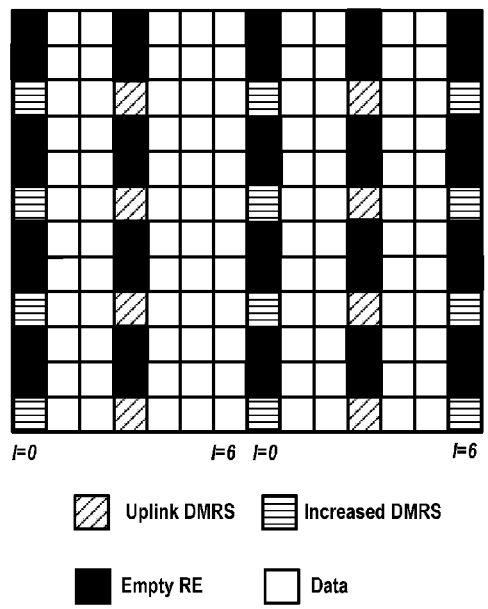

Additionally, FIG. 3C also illustrates an exemplary uplink MTCRS pattern for MTC according to a further embodiment of the present disclosure. The MTCRS pattern is similar to that illustrated in FIG. 3B. however resource elements for reference signals are spaced in the frequency domain by two subcarriers instead of only one subcarrier. By means of the MTCRS pattern as illustrated in FIG. 3B, it may achieve a power boosting at about 3 dB, while for the MTCRS pattern as illustrated in FIG. 3C, it may achieve a power boosting of about 4.7 dB. This lies in that more power from more empty REs may be used for power boosting.

Reference is made back to FIG. 2, at step S206, the eNB may perform data detection based on the mapping of the new-type reference signals so that data may be obtained from signals transmitted from the UE.

Figure 4:
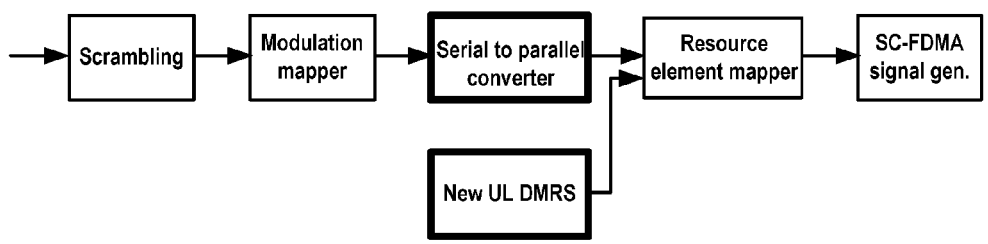
Figure 5:
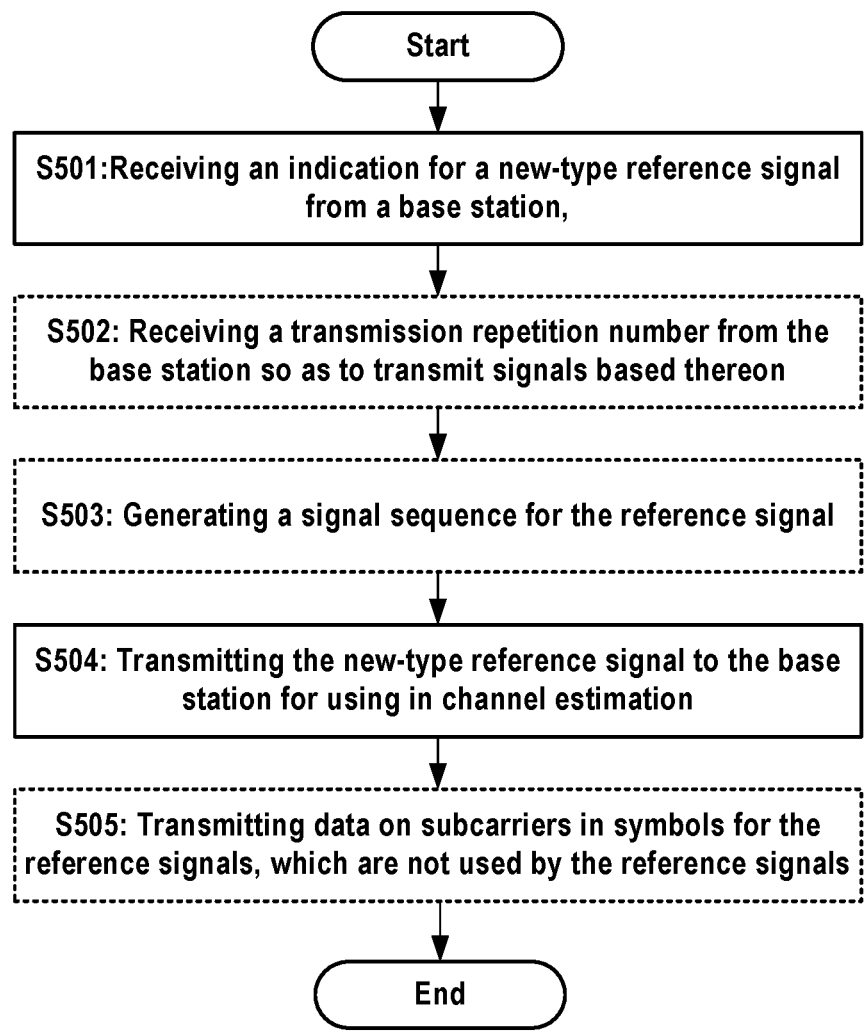
FIG. 5 schematically illustrates a flowchart of a method for uplink data transmission at a UE in a wireless communication system according to an embodiment of the present disclosure.

Additionally, with the MTCRS pattern as proposed in the present invention, the uplink physical channel processing will be different to those in prior art. Next, reference will be made to FIG. 4 to describe the uplink physical channel processing according to an embodiment of the present disclosure, in which the main differences are illustrated by blocks in black heavy lines.

As illustrated, at a UE, the transform precoder is substituted with a serial to parallel converter and there is newly added a new UL DMRS module, which is responsible for providing a new UL DMRS according the MTCRS pattern as proposed in the present disclosure. After being scrambled and mapped by scrambling module and modulation mapper, the data signal will be converted by the the serial to parallel converter or a DFT module, the new UL DMRS will be overlapped over the converted data signals. Then the composited signal will be mapped into frequency domain resource by reference element mapper and then it will generate SCX-FDMA signal for transmission. Through such modifications, the uplink physical channel processing will be adapted to the MTCRS pattern as proposed in the present disclosure.

Next, a corresponding procedure at the UE will be described at length with reference to FIG. 6, which illustratively illustrates a method for uplink data transmission at a UE in a wireless communication system according to an embodiment of the present disclosure.

As illustrated, in step S501, the UE will receive an indication for the new-type reference signal from the base station. In embodiments of the present disclosure, the new-type reference signal may be sent in a UE-specific way, i.e., the new-type reference signal may be sent only when the PUSCH is scheduled for the user equipment. Therefore, it is possible to configure a UE individually in terms of the new-type reference signal. The indication may be used to inform the UE that a new-type reference signal will be employed. This means the UE is required to transmit the new-type reference signal MTCRS to the base station.

Besides, at step S502, the UE may further receive a transmission repetition number from the eNB and thus the UE may learn how may times it should retransmit a signal. In such a way, the UE may transmit signals based on the transmission repetition number. For example, the UE will perform retransmission on a signal as long as the number of real transmission repetition does not exceed the transmission repetition number as indicated by the eNB.

Then at Step S503, the UE may generate a signal sequence for the new-type reference signals. As described previously, the new-type reference signals are reference signals different from the legacy reference signals, and it may be designed so that the new-type reference signals have a reduced density of reference signals in frequency domain, and resource elements not used by reference signals in symbols for the new-type reference signals are used for coverage enhancement. Specifically, the new-type reference signals comprise reference signals spaced by one or more subcarriers in the frequency domain. On the other hand, in the time domain, the new-type reference signals may have an increased density of reference signals in time domain. For example, the new-type reference signals comprise reference signals in legacy symbols for reference signals and additional reference signals in symbols spaced from the legacy symbols by two symbols in time domain.

The reference signal sequence may be generated as follows. Similar to original reference signal sequences, reference signal sequences $r_{u,v}^{(\alpha)}(n)$ for the DMRS may be defined by a cyclic shift $\alpha$ of a base sequence $\bar{r}_{u,v}(n)$ according to $$r_{u,v}^{(\alpha)}(n) = e^{j\alpha n}\bar{r}_{u,v}(n), \ 0 \leq n < M_{sc}^{RS}$$

wherein $M_{sc}^{RS} = mN_{sc}^{RB}$ and it is the length of the reference signal sequence and $1 \leq m \leq N_{RB}^{max,UL}$. Multiple reference signal sequences are defined from a single base sequence through different values of $\alpha$.

The base sequences $\bar{r}_{u,v}(n)$ may be divided into groups, where $u \in \{0, 1, \ldots, 29\}$ is the group number and v is the base sequence number within the group, such that each group contains one base sequence (v=0) of each length $M_{sc}^{RS} = mN_{sc}^{RB}$, $1 \leq m \leq 5$ and two base sequences (v=0, 1) of each length $M_{sc}^{RS} = mN_{sc}^{RB}$, $6 \leq m \leq N_{RB}^{max,UL}$. For the MTC, it is suitable that each group contains one base sequence, i.e., v=0. The sequence group number u may vary in time respectively.

For the MTCRS, the base sequence $\bar{r}_{u,v}(n)$ may be given by $$\bar{r}_{u,v}(n) = e^{j\theta(n)\pi/4}, \ 0 \leq n \leq M_{sc}^{RS}-1$$

where n is odd number (for MTCRS pattern illustrated in FIGS. 3A and 3B).

For $\theta(n)$, there are various approaches to generate it. As an example, it may generate it by sampling original base sequence $\varphi(n)$, which is illustrated in table as illustrated in FIG. 6. That is to say, the generation of the reference signals sequence can be similar to conventional approaches. However, due to decreasing of subcarrier for reference signals in frequency domain, the reference signal sequence may be obtained by sampling from the original base sequences, or in other word, only part of an original base sequence are used to form the new reference signal sequence. For example, it may be sampled or selected based on cross-correlation. An example θ(n) obtained by sampling may be as follows:

θ(0) . . . θ(5)={3,3,3,−3,3,1}.

Besides, it is also feasible to generate θ(n) through computer generation approach so that the sequence has a better cross-correlation. An example θ(n) obtained by computer generation may be given as follows:

θ(0) . . . θ(5)={−3,−3,−1,−1,3,1}.

Figure 7:
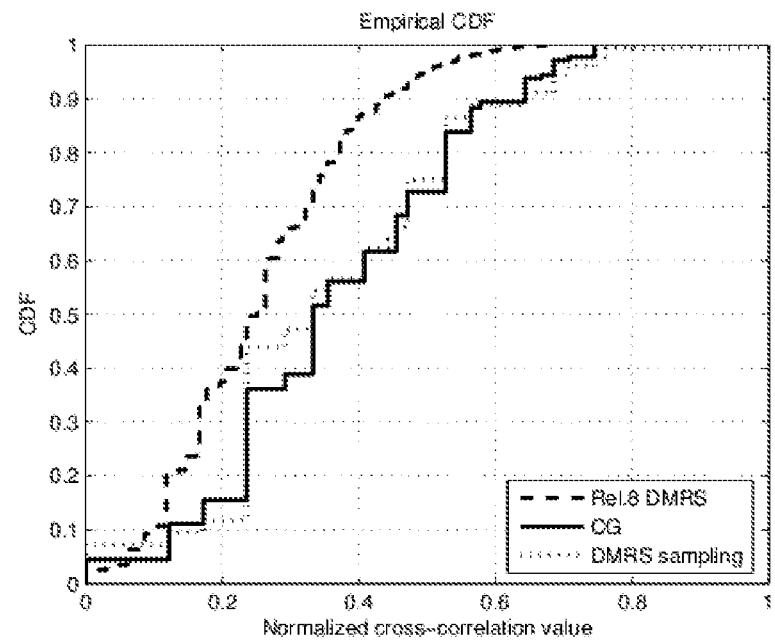
FIG. 7 schematically illustrates a CDF of cross-correlation of DMRS sequences according to an embodiment of the present disclosure.

FIG. 7 illustrates a CDF of cross-correlation for DMRS sequence according to an embodiment of the present disclosure. From this figure, it is clear that the performance of the cross-correlation for new MTCRS pattern is acceptable considering that the dominant factor is noise for low SNR MTC UE.

Besides, for the MTCRS pattern as illustrated in FIGS. 3B and 3C, it may support power boosting. In such a case, it might bring out a higher Peak to Average Power Ratio (PAPR), which in turn causes poor power efficiency or serious performance degradation to transmit power amplifier. To reduce the PAPR problem, the reference signal sequence may be generated based on cubic metric (CM), i.e. so that the CM is minimized. In the following, example UL reference signal sequences generated based on CM are provided for a purpose of illustration:

Sampling:
   sequence_0={1, −3, −3, −1, 3, 1}, CM=0.717
Computer Generation:
   sequence_1={−3, −1, 1, −3, 1, 1], CM=0.2708
   sequence_2={1, −1, −3, −3, −3,1], CM=0.2708

Figure 8:
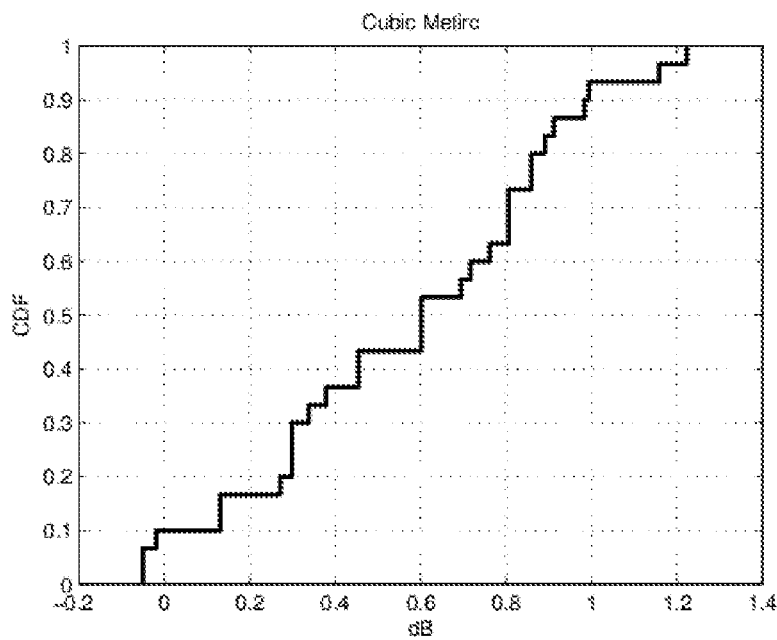
FIG. 8 schematically illustrates a CDF of cube metrics (CM) of DMRS sequences according to another embodiment of the present disclosure.

Due to the fact different criteria for sequence generation are used, generated sequences are different from those generated based on cross-correlation. FIG. 8 illustrates a CDF of CM for MTCRS pattern according to an embodiment of the present disclosure. It may be seen that in a case of using power boosting, CM of new DMRS is low and thus the PAPR problem may be addressed.

After the reference signal sequence has been generated, the UE may transmit the new-type reference signal to the base station eNB according to the received indication at step S504.

Additionally, as described hereinabove, not all REs in symbols for the reference signals are occupied by reference signals, those subcarriers that are not used by the reference signals may be used to transmit PUSCH data. Therefore, at step S505, the UE may further transmit data in REs that are not used by the reference signals.

Alternatively, REs in symbols for the reference signals, which are not used by the reference signals may also kept unused as empty resource elements. In such a case, the reference signals may be transmitted at an increased power which is borrowed from the empty resource elements so that power boosting may be performed to improve the channel estimation accuracy.

Figure 9A:
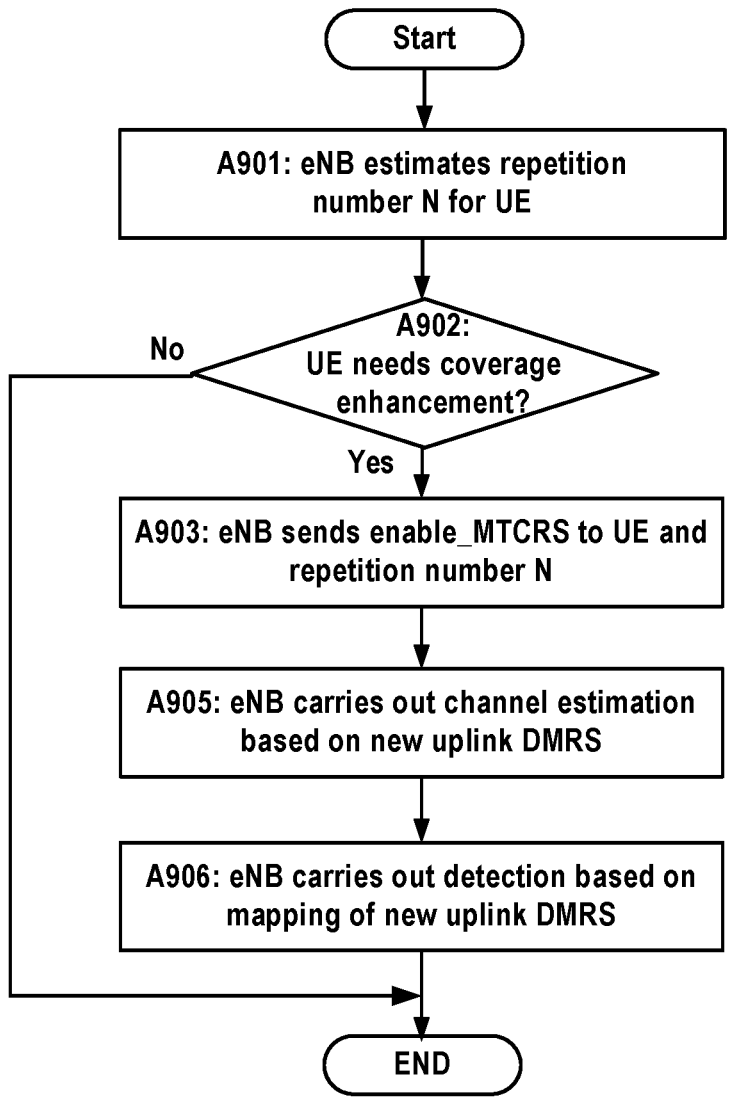
FIG. 9A schematically illustrates a specific implementation of uplink data transmission at an eNB according to an embodiment of the present disclosure.
Figure 9B:
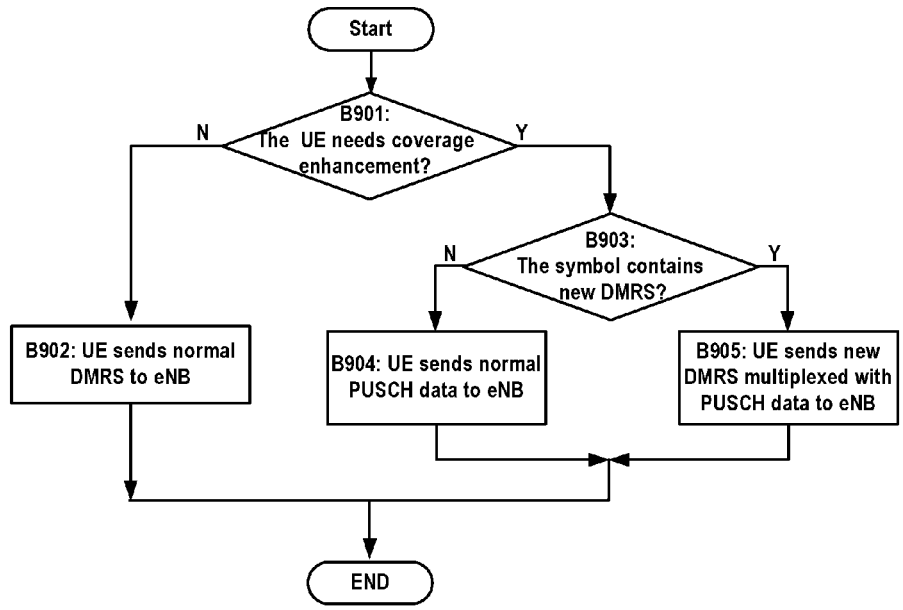
FIG. 9B schematically illustrates a specific implementation of uplink data transmission at a UE according to another embodiment of the present disclosure.
Figure 9C:
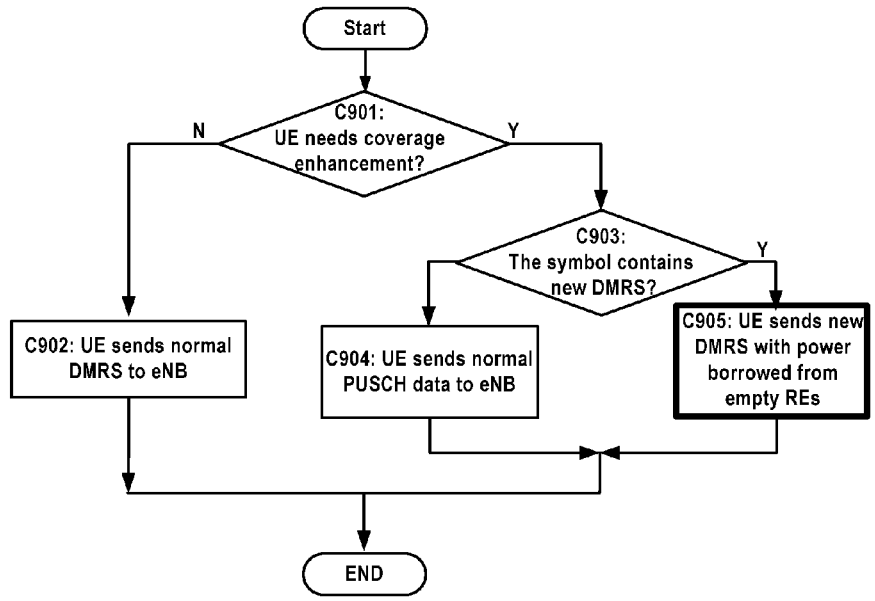
FIG. 9C schematically illustrates a specific implementation of uplink data transmission at an eNB according to a further embodiment of the present disclosure.

Besides, in FIGS. 9A, 9B and 9C, there are further illustrated specific implementations of uplink data transmission according to embodiments of the present disclosure.

Reference will be first made to FIG. 9A which illustrates a specific implementation of uplink data transmission at an eNB according to an embodiment of the present disclosure. As illustrated in FIG. 9A, at step A901, the eNB may estimate the transmission repetition number for a UE. Specifically, the eNB first estimates SNR of the UE and then it may determine the repetition number N based on the estimated SNR and a predetermined relationship curve of the SNR and the repetition number. For example, by looking up the predetermined relationship curve with the estimated SNR, it may find a repetition number N corresponding to the estimated SNR, which may be determined as the transmission repetition number for the UE.

After that, at step A902, it may determine whether the UE needs coverage enhancement or not. For example, if the estimated SNR is lower than a predetermined threshold or the UE belongs to a type of UE with a low SNR, it may determine the UE needs coverage enhancement. If the UE needs coverage enhancement, then the procedure proceeds into step A903, at which the eNB sends an enable MTCRS indication to the UE to indicate that the MTCRS should be used instead of the conventional DMRS signals. Additionally, the eNB may transmit the estimated repetition number N to the UE so that the UE may learn the repletion number for transmitting signals. On the other hand, if the UE does not require coverage enhancement, the procedure ends. After receiving MTCRS from a UE, the eNB may carry out channel estimation based on the new uplink DMRS at step A905. Then at Step A906, it may further carry out detection based on a mapping of the new uplink DMRS so as to obtain data contained in signals transmitted from the UE.

FIG. 9B schematically illustrates a specific implementation of uplink data transmission at a UE according to an embodiment of the present disclosure. As illustrated, at step B901, the UE may first determine whether the UE needs coverage enhancement, for example based on whether a coverage enhancement indication is received or not. If the UE does not need coverage enhancement, then the procedure proceeds into step B902, at which the UE sends normal DMRS to the eNB.

On the other hand, if the UE needs coverage enhancement, the method proceeds into step B903 at which it is further determined whether the current symbol contains new DMRS or not. If the symbol does not contain the new DMRS, then the UE may send normal PUSCH data to the eNB at step B904. If the symbol contains the new DMRS, the UE may send the new DMRS multiplexed with the PUSCH data to the eNB at step B905.

In FIG. 9B, there is illustrated an implementation in which subcarriers not used by the reference signals in symbols for the reference signals are used to transmit uplink data while FIG. 9C illustrates another implementation in which these subcarriers not used by the reference signals are kept unused as empty reference signals. In FIG. 9C, steps C901 to C904 are similar to steps B901 to B904 and thus are not elaborated herein. However, at step C905, UE will perform a power boosting by means of power borrowed from those empty resource elements. In other word, the UE will allocate the empty REs' power to the DMRS REs. The MTC has a low SNR and thus it can only use one modulation mode, i.e., QPSK. Hence, in such a case, the power offset for DMRS and PUSCH is not needed for demodulation. Accordingly, no power offset is required to signal to the eNB.

Additionally, in the present disclosure, there are also provided apparatuses for uplink data transmission in a wireless communication system. Next, reference will be made to FIGS. 10 to 11 to describe the apparatuses as provided in the present disclosure.

Figure 10:
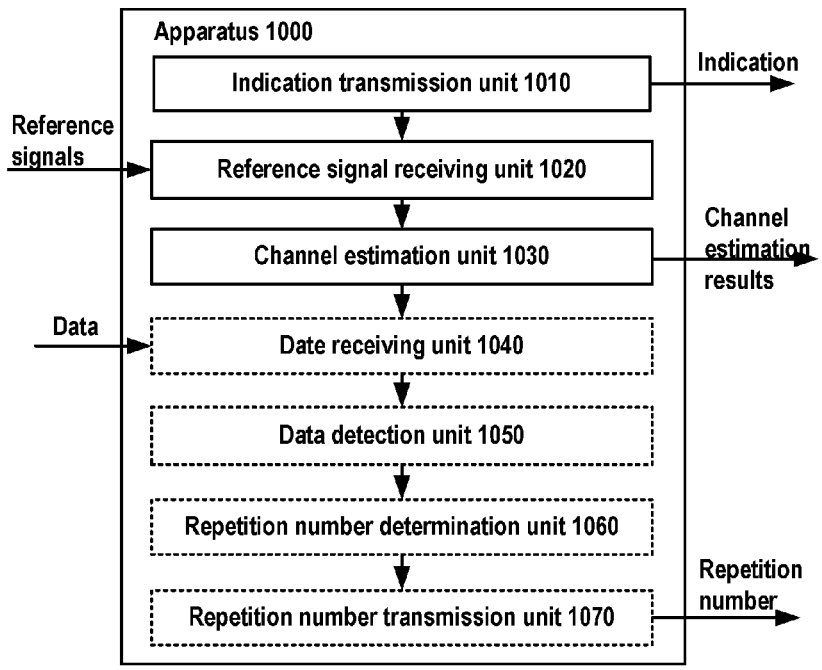
FIG. 10 schematically illustrates a block diagram of an apparatus for uplink data transmission at an eNB in a wireless communication system according to an embodiment of the present disclosure.

FIG. 10 schematically illustrates an apparatus 1000 for uplink data transmission at an eNB in a wireless communication system according to an embodiment of the present disclosure. As illustrated in FIG. 10, the apparatus 1000 may comprise an indication transmission unit 1010, a reference signal receiving unit 1020 and a channel estimation unit 1030. The indication transmission unit 1010 may be configured to transmit an indication for new-type reference signals to a user equipment. The reference signal receiving unit 1020 may be configured to receive the new-type reference signals. The channel estimation unit 1030 may be configured to perform channel estimation based on the new-type reference signals.

In embodiments of the present disclosure, the new-type reference signals have a reduced density of reference signals in frequency domain, and resource elements not used by reference signals in symbols for the new-type reference signals are used for coverage enhancement. For example, the new-type reference signals comprise reference signals spaced by one or more subcarriers in the frequency domain. On the other hand, the new-type reference signals may also have an increased density of reference signals in time domain. As an example, the new-type reference signals may comprise reference signals in legacy symbols for reference signals and additional reference signals in symbols spaced from the legacy symbols by two symbols in time domain.

Besides, the apparatus may further comprise a data receiving unit 1040, which may be configured to receive data in the resource elements not used by reference signals in the symbols for the new-type reference signals. Alternatively, the resource elements not used by reference signals in the symbols for the new-type reference signals may be kept unused as empty resource elements. In such a case, the new-type reference signals are transmitted with an increased power that is borrowed from the empty resource elements.

The apparatus 1000 may further comprise a data detection unit 1050 configured to perform data detection based on a mapping of the new-type reference signals. The apparatus 1000 may also comprise a repetition number determination unit 1060 and a repetition number transmission unit 1070. The repetition number determination unit 1060 may be configured to estimate a transmission repetition number for the user equipment based on signal to noise ratio; the repetition number transmission unit 1070 may be configured to transmit the transmission repetition number to the user equipment.

In an embodiment of the present disclosure, the apparatus may be operated in response to a coverage enhancement determination for the user equipment. In addition, in embodiments of the present disclosure, the new-type reference signals may comprise demodulation reference signals (DMRS).

Figure 11:
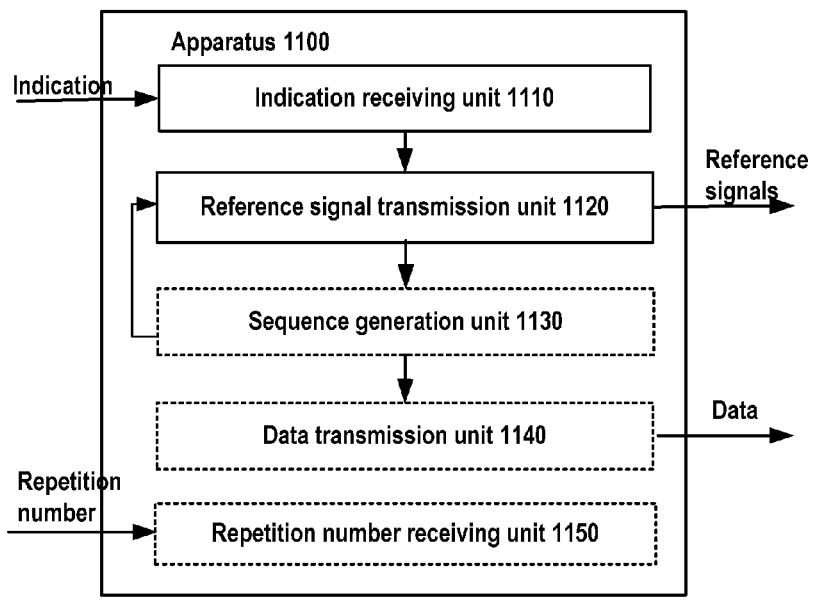
FIG. 11 schematically illustrates a block diagram of an apparatus for uplink data transmission at a UE in a wireless communication system according to an embodiment of the present disclosure.

Besides, FIG. 11 schematically illustrates an apparatus 1100 for uplink data transmission at a UE in a wireless communication system according to an embodiment of the present disclosure. As illustrated, the apparatus 1100 may comprise an indication receiving unit 1110 and a reference signal transmission unit 1120. The indication receiving unit 1110 may be configured to receive an indication for new-type reference signals from a base station, wherein the new-type reference signals have a reduced density of reference signals in frequency domain, and resource elements not used by reference signals in symbols for the new-type reference signals are used for coverage enhancement. The reference signal transmission unit 1120 may be configured to transmit the new-type reference signals to the base station for using in channel estimation. The new-type reference signals have a reduced density of reference signals in frequency domain, and resource elements not used by reference signals in symbols for the new-type reference signals are used for coverage enhancement. For example, the new-type reference signals comprise reference signals spaced by one or more subcarriers in the frequency domain. On the other hand, the new-type reference signals may also have an increased density of reference signals in time domain. As an example, the new-type reference signals may comprise reference signals in legacy symbols for reference signals and additional reference signals in symbols spaced from the legacy symbols by two symbols in time domain.

The apparatus 1100 may further comprise a sequence generation unit 1130. The sequence generation unit 1130 may be configured to generate a signal sequence for the new-type reference signal by sampling original base signal sequences. The apparatus 1100 may also comprise a data transmission unit 1140 that may be configured to transmit data in the resource elements not used by reference signals in the symbols for the new-type reference signals.

In an embodiment of the present disclosure, the resource elements not used by reference signals in the symbols for the new-type reference signals are kept unused as empty resource elements. In such a case, the signal transmission unit 1120 may be further configured to transmit the new-type reference signals with an increased power that is borrowed from the empty resource elements.

In addition, the apparatus may further comprise a repetition number receiving unit 1150 that is configured to receive a transmission repetition number from the base station so as to transmit signals based thereon.

In embodiments of the present disclosure, the method may be performed in response to a coverage enhancement determination for the user equipment. Furthermore, the new-type reference signals comprise demodulation reference signals (DMRS).

It is noted that the apparatuses 1000 and 1100 may be configured to implement functionalities as described with reference to FIG. 2 to FIG. 9. Therefore, for details about the operations of modules in these apparatus, one may refer to those descriptions made with respect to the respective steps of the methods with reference to FIG. 2 to FIG. 9.

It is further noted that the components of the apparatuses 1000 and 1100 may be embodied in hardware, software, firmware, and/or any combination thereof. For example, the components of apparatuses 1000 and 1100 may be respectively implemented by a circuit, a processor or any other appropriate selection device. Those skilled in the art will appreciate that the aforesaid examples are only for illustration not limitation.

In some embodiment of the present disclosure, each of apparatuses 1000 and 1100 comprises at least one processor. The at least one processor suitable for use with embodiments of the present disclosure may include, by way of example, both general and special purpose processors already known or developed in the future. Each of apparatuses 1000 and 1100 further comprises at least one memory. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compliable or interpretable programming languages. In accordance with embodiments, the computer executable instructions may be configured, with the at least one processor, to cause apparatuses 1000 and 1100 to at least perform operations according to the method as discussed with reference to FIGS. 2 to 9 respectively.

Figure 12A:
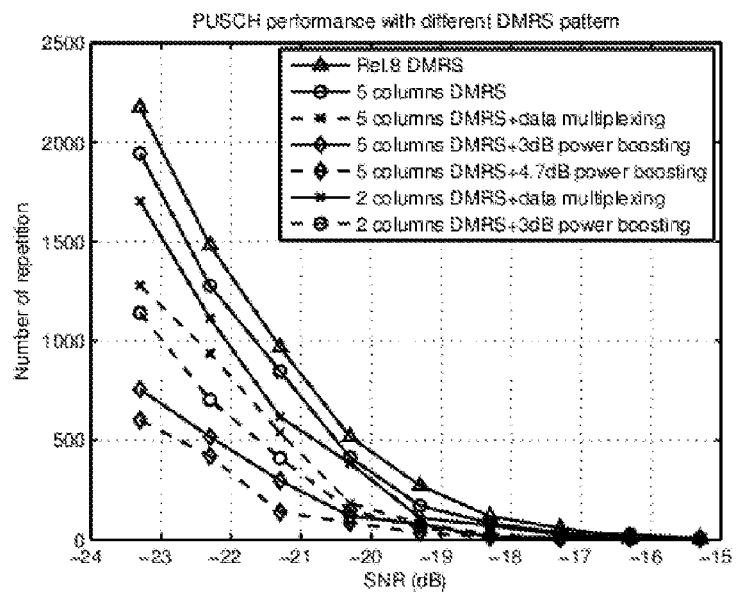
FIGS. 12A and 12B schematically illustrates simulation results on performance of seventh different schemes.
Figure 12B:
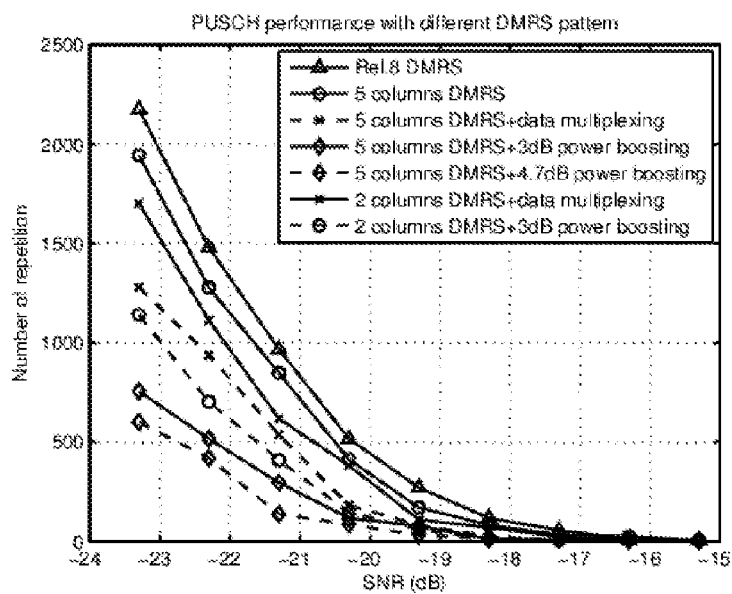

In addition, FIGS. 12A and 12B illustrate simulation results made on an embodiment of the present invention and the existing solution in the prior art. Parameters used in the simulations are listed in Table 1.

TABLE 1

Parameters used in the simulations

| Parameter | Assumptions used for simulation |
| --- | --- |
| System bandwidth | 1.4 MHz |
| Frame structure | FDD or TDD |
| UL-DL configuration | 0 |
| Carrier frequency | 2.0 GHz for FDD/2.6 GHz for TDD |
| Antenna configuration | 2 × 2, low correlation |
| Channel model | EPA, |
| Doppler spread | 1 Hz, |
| MCS | 0 Note: it needs to satisfy the traffic requirements agreed before |
| Number of DL RBs | 6, Note: it needs to satisfy the traffic requirements agreed before |
| Transmission mode | TM2 |
| Frequency tracking error | 100 Hz or 0 Hz |
| Performance target | 10% iBLER |
| Channel estimation | Realistic multiple subframes channel estimation & ideal channel estimation, filter length should be indicated Note: one subframe channel estimation is not precluded |
| The minimum required SINR | −2.3 dB |
| Output | The amount of repetitions at the minimum required SINR |

FIGS. 12A and 12B illustrate simulation results on performance of seven different schemes. In these schemes, scheme 1 "Rel. 8 DMRS" represents a scheme using DMRS pattern as specified in Rel. 8; scheme 2 "5 column DMRS" denote a scheme using MTCRS pattern with five columns of symbols for reference signals; scheme 3 "5 column DMRS+ data multiplexing" denotes a scheme using MTCRS pattern as illustrated in FIG. 3A with data multiplexing; scheme 4 "5 column DMRS+3 dB power boosting" denotes a scheme using MTCRS pattern as illustrated in FIG. 3B; scheme 5 "5 column DMRS+4.7 db power boosting" denotes a scheme using MTCRS pattern as illustrated in FIG. 3C; scheme 6 "2 column DMRS+data multiplexing" denotes a scheme in which the data multiplexing is combined with a MTCRS pattern that only the density of reference signals are reduced by half in frequency domain; scheme 7 "2 column DMRS+3 db power boosting" denotes a scheme in which the power boosting is combined with the MTCRS pattern that only the density of reference signals are reduced by half in frequency domain.

It is clear that MTCRS with power boosting or data multiplexing can reduce the number of repetition and improve the system throughput even the density of reference signal are not increased in time domain. Therefore, with embodiments of the present disclosure, it may reduce the density of reference signals in frequency domain, which means the overhead will not be increased substantially and besides saved resource element may be used to implement the coverage enhancement. Thus, the number of retransmission of MTC UE in low SNR could be further reduced which in turn result in the improvement of the system throughput. Accordingly, it is possible for a UE with a low SNR to be used in LTE networks.

The skilled in the art may appreciate that uplink MTCRS pattern and mapping given herein are only for a purpose of illustration and many other alternative pattern may be used without departing the scope and spirit of the present disclosure.

Additionally, it may also be appreciated that the embodiments of the present disclosure are described with reference to MTC, however the present invention is not limited thereto and the present invention may be used any communication with a low SNR in LTE system.

Additionally, based on the above description, the skilled in the art would appreciate that the present disclosure may be embodied in an apparatus, a method, or a computer program product. In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flowcharts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The various blocks shown in the accompanying drawings may be viewed as method steps, and/or as operations that result from operation of computer program code, and/or as a plurality of coupled logic circuit elements constructed to carry out the associated function(s). At least some aspects of the exemplary embodiments of the disclosures may be practiced in various components such as integrated circuit chips and modules, and that the exemplary embodiments of this disclosure may be realized in an apparatus that is embodied as an integrated circuit, FPGA or ASIC that is configurable to operate in accordance with the exemplary embodiments of the present disclosure.

While this specification contains many specific implementation details, these should not be construed as limitations on the scope of any disclosure or of what may be claimed, but rather as descriptions of features that may be specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Various modifications, adaptations to the foregoing exemplary embodiments of this disclosure may become apparent to those skilled in the relevant arts in view of the foregoing description, when read in conjunction with the accompanying drawings. Any and all modifications will still fall within the scope of the non-limiting and exemplary embodiments of this disclosure. Furthermore, other embodiments of the disclosures set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purposes of limitation.

What is claimed is:

1. A method for uplink data transmission in a wireless communication system, comprising:
   transmitting an indication for new-type reference signals to a user equipment, wherein the new-type reference signals have a reduced density of reference signals in frequency domain, and resource elements not used by reference signals in symbols for the new-type reference signals are used for coverage enhancement;
   receiving the new-type reference signals; and
   performing channel estimation based on the new-type reference signals,
   wherein the resource elements not used by reference signals in the symbols for the new-type reference signals are kept unused as empty resource elements, and
   wherein the new-type reference signals are transmitted with an increased power that is borrowed from the empty resource elements.

2. The method according to claim 1, wherein the new-type reference signals comprise reference signals spaced by one or more subcarriers in the frequency domain.

3. The method according to claim 1, wherein the new-type reference signals have an increased density of reference signals in time domain.

4. The method according to claim 3, wherein the new-type reference signals comprise reference signals in legacy symbols for reference signals and additional reference signals in symbols spaced from the legacy symbols by two symbols in the time domain.

5. The method according to claim 1, further comprising:
   receiving data in the resource elements not used by reference signals in the symbols for the new-type reference signals.

6. The method according to claim 1, further comprising:
   performing data detection based on a mapping of the new-type reference signals.

7. The method according to claim 1, wherein the method is performed in response to a coverage enhancement determination for the user equipment.

8. The method according to claim 1, further comprising, estimating a transmission repetition number for the user equipment based on signal to noise ratio; and
   transmitting the transmission repetition number to the user equipment.

9. The method according to claim 1, wherein the new-type reference signals comprise demodulation reference signals (DMRS).

10. A method for uplink data transmission in a wireless communication system, comprising:
    receiving an indication for new-type reference signals from a base station, wherein the new-type reference signals have a reduced density of reference signals in frequency domain, and resource elements not used by reference signals in symbols for the new-type reference signals are used for coverage enhancement; and
    transmitting the new-type reference signals to the base station for using in channel estimation, the new-type reference signals being transmitted with an increased power that is borrowed from the empty resource elements; and
    transmitting data in the resource elements not used by reference signals in the symbols for the new-type reference signals.

11. The method according to claim 10, wherein the new-type reference signal comprises reference signals spaced by one or more subcarriers in the frequency domain.

12. The method according to claim 10, wherein the new-type reference signals have an increased density of reference signals in time domain.

13. The method according to claim 12, wherein the new-type reference signals comprise reference signals in legacy symbols for reference signals and additional reference signals in symbols spaced from the legacy symbols by two symbols in the time domain.

14. The method according to claim 10, further comprising:
    generating a signal sequence for the new-type reference signal by sampling original base signal sequences.

15. The method according to claim 10, wherein the resource elements not used by reference signals in the symbols for the new-type reference signals are kept unused as empty resource elements.

16. The method according to claim 10, further comprising receiving a transmission repetition number from the base station so as to transmit signals based thereon.

17. The method according to claim 10, wherein the method is performed in response to a coverage enhancement indication for the user equipment.

18. The method according to claim 10, wherein the new-type reference signals comprise demodulation reference signals (DMRS).

19. An apparatus for uplink data transmission in a wireless communication system, comprising:
    an indication transmission circuit configured to transmit an indication for new-type reference signals to a user equipment, wherein the new-type reference signals have a reduced density of reference signals in frequency domain, and resource elements not used by reference signals in symbols for the new-type reference signals are used for coverage enhancement;
    a signal receiving circuit configured to receive the new-type reference signals; and
    an estimation performing circuit configured to perform channel estimation based on the new-type reference signals,
    wherein the resource elements not used by reference signals in the symbols for the new-type reference signals are kept unused as empty resource elements, and
    wherein the new-type reference signals are transmitted with an increased power that is borrowed from the empty resource elements.

20. The apparatus according to claim 19, wherein the new-type reference signals comprise reference signals spaced by one or more subcarriers in the frequency domain.

21. The apparatus according to claim 19, wherein the new-type reference signals have an increased density of reference signals in time domain.

22. The apparatus according to claim 21, wherein the new-type reference signals comprise reference signals in legacy symbols for reference signals and additional reference signals in symbols spaced from the legacy symbols by two symbols in the time domain.

23. The apparatus according to claim 19, further comprising: a data receiving circuit configured to receive data in the resource elements not used by reference signals in the symbols for the new-type reference signals.

24. The apparatus according to claim 19, wherein the reference signals comprise a demodulation reference signals (DMRS).

25. An apparatus for uplink data transmission in a wireless communication system, comprising:
    an indication receiving circuit configured to receive an indication for new-type reference signals from a base station, wherein the new-type reference signals have a reduced density of reference signals in frequency domain, and resource elements not used by reference signals in symbols for the new-type reference signals are used for coverage enhancement; and
    a signal transmission circuit configured to transmit the new-type reference signals to the base station for using in channel estimation,
    wherein the resource elements not used by reference signals in the symbols for the new-type reference signals are kept unused as empty resource elements, and wherein the signal transmission circuit is further configured to transmit the new-type reference signals with an increased power that is borrowed from the empty resource elements.

26. The apparatus according to claim 25, wherein the new-type reference signal comprises reference signals spaced by one or more subcarriers in the frequency domain.

27. The apparatus according to claim 25, wherein the new-type reference signals have an increased density of reference signals in time domain.

28. The apparatus according to claim 27, wherein the new-type reference signals comprise reference signals in legacy symbols for reference signals and additional reference signals in symbols spaced from the legacy symbols by two symbols in the time domain.

29. The apparatus according to claim 25, further comprising: a sequence generation circuit configured to generate a signal sequence for the new-type reference signal by sampling original base signal sequences.

30. The apparatus according to claim 25, further comprising: a data transmission circuit configured to transmit data in the resource elements not used by reference signals in the symbols for the new-type reference signals.

31. The apparatus according to claim 25, wherein the new-type reference signals comprise demodulation reference signals (DMRS).

* * * * *